3,449,073
PROCESS FOR PREPARING CHROMIUM DIOXIDE
AND PRODUCT THEREOF
Joseph H. Balthis, Jr., Mendenhall, Del., assignor to E. I.
du Pont de Nemours and Company, Wilmington, Del.,
a corporation of Delaware
No Drawing. Filed Dec. 14, 1965, Ser. No. 513,825
Int. Cl. C01g 37/02
U.S. Cl. 23—145                                    9 Claims

ABSTRACT OF THE DISCLOSURE

Described and claimed is a process for preparing ferromagnetic chromium oxide at elevated temperatures and pressures from at least one chromium oxide wherein the average valence of chromium is at least 4 in the presence of an alkali metal dichromate and water. When the only chromium oxide present is $CrO_3$, fibrous ferromagnetic chromium oxide is produced, and this novel material forms an additional aspect of the invention.

FIELD OF THE INVENTION

This invention relates to, and has as its principal objects provision of, a novel process for the preparation of ferromagnetic chromium dioxide and novel flexible fibrous chromium dioxide produced thereby.

DESCRIPTION OF THE INVENTION

In present technology, magnetic materials, particularly those having high saturation magnetization, are extensively used in a variety of applications such as magnetic recording, coil cores, and permanent magnets. Chromium dioxide has high saturation magnetization and recently processes have been described for its preparation by hydrothermal treatment of chromium oxides in which the average chromium valence is greater than 4. These processes provide ferromagnetic chromium dioxide in particulate forms composed of particles not greater than about 10 microns in maximum dimension. Processes for the preparation of chromium dioxide in massive form by the thermal decomposition of chromyl chloride are also known.

The present invention provides a novel process for preparation of ferromagnetic chromium dioxide in the form of acicular particles. This process comprises heating a chromium oxide or a mixture of chromium oxides in which the chromium has an average valence of at least 4 in the presence of an alkali metal dichromate flux (not considered a chromium oxide in this specification) and water in an amount of at least two moles per mole of dichromate at 350–500° C. under a pressure of at least 250 atmospheres. Chromium (III) oxide, $Cr_2O_3$, may also be present as a reactant. By suitable adjustment of process variables as described more fully below, chromium dioxide having a preponderance of particles longer than 10 microns can be prepared in a novel fibrous form.

A higher-valent chromium oxide, i.e., a chromium oxide or a mixture of chromium oxides wherein the chromium has an average valence of at least 4, is a necessary starting material in the process of this invention. This material is preferably chromium (VI) oxide, $CrO_3$, but other oxides, such as $Cr_2O_5$ and $Cr_3O_8$, and mixtures thereof with each other and with $CrO_3$, can be used. The requisite higher-valent oxide can also be prepared in situ, for example, by employing an acid, such as nitric acid, to react with dichromate present in the reaction mixture.

When chromium (VI) oxide is the only chromium oxide employed as starting material, the chromium dioxide is produced at least partly in the form of long, thin, fibrous, flexible, highly magnetic ribbons or filaments ranging from 20 microns up to 200 microns or more in length. These particles are unusually uniform dimensionally for inorganic fibrous materials and have an axial ratio, i.e., a ratio of length to width of at least 10:1 and usually in the range of 50:1 to 200:1 or more. They also possess high saturation magnetization. Products of much smaller particle size having much higher coercivity can be prepared by adding a reactive form of chromium (III) oxide to the reaction mixture. Both types of particles, i.e., the long fibrous ribbons, as well as the smaller particles, are believed to be single crystals and on the basis of examination by the Bitter pattern and Lorentz microscopy techniques appear to be single magnetic domains.

The temperature and pressure at which conversion to ferromagnetic chromium dioxide is carried out are interrelated, and, in general, the higher the temperature employed within the operable range the higher the pressure required for optimum results. Although pressures of 3000 atmospheres or more can be employed, lower pressures are preferred since they permit the use of simpler, less expensive equipment. High pressures and temperatures usually result in the formation of chromium dioxide of larger particle size. The pressure will usually be in the range of 500–1000 atmospheres, and when such pressures are employed the reaction temperature is preferably in the range of 350–450° C.

Reaction conditions are usually maintained for 1–24 hours or longer. In many cases a reaction time of about 10 hours has been found convenient.

The preparation of ferromagnetic chromium dioxide in accordance with the present invention is carried out in the presence of easily fused alkali metal dichromate and limited quantities of water as reaction medium. A quantity of dichromate in the range of 0.25–10 parts (by weight) per part of higher-valent chromium oxide is normally employed. Larger proportions of dichromate can be used but the productivity of the reaction equipment is thereby reduced. It is preferred to use approximately 2.5 parts of dichromate per part of higher-valent chromium oxide. Any of the alkali metal dichromates, i.e., lithium dichromate, sodium dichromate, potassium dichromate, rubidium dichromate, cesium dichromate, or mixtures thereof can be employed. The dichromates of lithium, sodium and potassium are preferred. The amount of water employed preferably should be at least 2 moles but not exceed 5 moles per mole of dichromate, and is better limited to about 4 moles per mole of dichromate. Particle size of the chromium dioxide produced tends to decrease as water content of the reaction mixture is increased but when excessively large quantities of water are employed conversion to chromium dioxide is incomplete. When a reaction temperature of 350° C. is employed, at least three moles of water per mole of dichromate should be used. In calculaing the proportion of water, as referred to above, water introduced in the form of water of hydration is included.

Various modifying agents can be used in the process of this invention. Examples of suitable modifying agents are shown in U.S. Patents 2,885,365, 2,934,683, 2,923,684, 2,923,685, 3,034,988 and 3,068,176. Of these, antimony, which can be used to reduce particle size and increase coercivity, and iron, which influences Curie temperature and coercivity, are preferred. Tellurium can also be employed. The proportion of modifier to be used is described in the above patents and ranges from 0.008 weight percent (based on the higher-valent chromium oxide reactant) in the case of ruthenium to 25% in the case of antimony. Usually the proportion of modifier will be below 14% and is preferably below 5%. It will be understood that compounds of the above-named elements as well as the elements themselves can be added as modifiers. Tellurium, for example, is preferably introduced in the form of the oxide, $TeO_2$, or telluric acid, $H_6TeO_6$.

Chromium (III) oxide, when employed, is usually present in an amount ranging up to 1.5 parts or more (by weight) per part of higher-valent chromium oxide. When more than 1.5 parts of chromium (III) oxide per part of higher-valent chromium oxide are employed, conversion to chromium dioxide may be incomplete. A reactive form of chromium (III) oxide suitable for use in the process of this invention is prepared by precipitation from aqueous chromium (III) nitrate or chromium (III) chloride solution using ammonium hydroxide. The precipitate of hydrous chromium (III) oxide is thoroughly washed with water to remove nitrate or chloride anions and is then heated or calcined at substantially atmospheric pressure, i.e., at a pressure in the range of 0.5–5 atmospheres and a temperature of 200–1000° C. This heating is preferably carried out under oxidizing conditions, i.e., in the presence of air or oxygen, to yield a product which may in certain cases contain chromium with an average valence above 3 but less than 4. Periods of time ranging from a few minutes, e.g., 10 minutes, to several hours, e.g., 24 hours, are usually sufficient for the heating step.

The process of this invention can be carried out in any equipment which is capable of providing the desired temperature and pressure conditions and is resistant to attack by the reaction mixture. In one convenient method, the desired reaction mixture is placed in a flexible platinum tube, the tube is sealed and subjected to the conditions of temperature and pressure selected. At the end of the desired reaction time, the sealed tube is cooled, preferably rapidly, and opened, the contents are removed, and the ferromagnetic chromium dioxide isolated by washing with water and drying. The product is dark gray to black, strongly magnetic chromium dioxide in the form of uniform small particles, ribbons or filaments with the known tetragonal crystal structure.

Separation of the longer chromium dioxide fibers which form one aspect of the invention from nonfibrous material produced at the same time can be accomplished by any convenient means, e.g., by hand. They can, however, be separated from any nonfibrous material by other conventional methods such as, for example, by wet-screening. This is conveniently accomplished with equipment of the type often used in the paper industry. In the wet-screening process, a slurry of material to be separated in a fluid suspending medium is caused to flow through a series of revolving screens having mesh sizes appropriate to the separation desired. Rotation of the screens causes the particles to be oriented with the long dimension more or less parallel to the screen surface, with the result that separation is achieved on a length basis. Sieves Nos. 100 (149 micron opening), 140 (105 micron opening), and 400 (37 micron opening) may be used for the separation of $CrO_2$ fibers of various lengths from products such as that of Example 12 (sieve numbers refer to U.S. Standard sieve series).

Whatever method is employed, the separation is most easily carried out if the $CrO_2$ particles are in a nonmagnetic state. The particles can be demagnetized by exposure to a rapidly alternating magnetic field in known manner. However, in using wet separation methods, it is often advantageous to carry out separation at a temperature approaching or above the Curie point to obviate the possible effect of stray magnetic fields. When such temperatures are used, a high-boiling, nonreactive liquid, e.g., a saturated petroleum fraction or an organic acid of appropriate boiling point, is employed as suspending medium.

Magnetic properties which are particularly important and which render these products useful in a variety of applications are the intrinsic coercive force $H_{ci}$, the saturation per gram or sigma value $\sigma_s$, and the remanence ratio $\sigma_r/\sigma_s$, i.e., the ratio of the retentivity or remanence per gram to the saturation per gram. Retentivity and saturation are defined on pages 5–8 of Bozorth's "Ferromagnetism," D. Van Nostrand & Company, New York (1951). The sigma values given herein are determined in a 4400-gauss field on apparatus similar to that described by T. R. Bardell on pages 226–228 of "Magnetic Materials in the Electrical Industry," Philosophical Library, New York (1955). The definition of intrinsic coercive force ($H_{ci}$) is given in Special Technical Publication No. 85 of the American Society for Testing Materials, entitled "Symposium of Magnetic Testing" (1948), pages 191–198. The values for intrinsic coercive force given herein are determined on a DC ballistic-type apparatus which is a modified form of the apparatus described by Davis and Hartenheim in the Review of Scientific Instruments 7, 147 (1936).

The process of this invention is illustrated by the following examples in which quantities are expressed in parts by weight, except as otherwise noted.

EXAMPLE 1

A mixture consisting of chromium trioxide, $CrO_3$ (2 g.), chromic oxide, $Cr_2O_3$ (1 g.), and sodium dichromate dihydrate, $Na_2Cr_2O_7 \cdot 2H_2O$ (5 g.), was thoroughly ground by hand in a dry box under nitrogen and placed in a platinum tube which was then hermetically sealed. The tube was introduced into a larger pressure vessel and subjected to 850 atmospheres pressure. To induce melting and reaction, the temperature was then raised at the rate of 2° C./minute to 265° C., and the latter temperature was maintained for 4 hours. The temperature was again raised at a rate of 2° C./minute to 400° C., at which temperature the pressure was 1000 atmospheres. A temperature of 400° C. was maintained for 6 hours whereupon the pressure vessel was cooled, and the platinum tube removed and opened. The product was a black solid which was washed thoroughly with water to remove watersoluble components. The water-insoluble portion consisted of small, strongly magnetic $CrO_2$ particles (2.2 g.) up to 2.5 microns in length and up to 0.5 micron in width. The magnetic properties were as follows:

$H_{ci}$, oersteds ------------------------------------ 246
$\sigma_s$ (gauss cm.$^3$/g.) ------------------------------- 90.3
$\sigma_r$ (gauss cm.$^3$/g.) ------------------------------- 39.8
$\sigma_r/\sigma_s$ ---------------------------------------------- 0.44

The product exhibited an X-ray pattern typical of the tetragonal crystal structure characteristic of chromium dioxide.

On microscopic examination the product was found to be composed of single crystals. The product was examined, the Lorentz technique with a defocused objective lens being employed, and showed no domain boundaries, i.e., the crystals were single magnetic domains.

EXAMPLES 2–10

These examples further illustrate the use of sodium dichromate in the process of this invention. The starting material employed, the reaction conditions used, and the magnetic characteristics of the products are summarized in Table I.

TABLE I

| Example No. | Charge (g.) | | | | | Magnetic Properties | | | | Particle size and shape |
|---|---|---|---|---|---|---|---|---|---|---|
| | $CrO_3$ | $Cr_2O_3$ | $Na_2Cr_2O_7 \cdot 2H_2O$ | Water | Cycle | $H_{ci}$ (oe.) | $\sigma_s$ (gauss cm.³/g.) | $\sigma_r$ (gauss cm.³/g.) | $\sigma_r/\sigma_s$ | |
| 2 | 3 | 0 | 7.5 | 0 | D | 38 | 92.1 | 19.4 | 0.21 | Length, 38–208 microns; width, 1.6–6 microns. |
| 3 | 2 | ¹1 | 10 | 0 | B | 282 | 87.4 | 39.0 | 0.45 | 10 microns or less by 0.5 micron or less. |
| 4 | 3 | 0 | 15 | 0 | F | 37 | 90.6 | 18.1 | 0.20 | 8–137 microns long by 0.8–6.4 microns wide. |
| 5 | 6 | 0 | 7.5 | 0 | F | 44 | 91.1 | 15.5 | 0.17 | 11.2–51 microns long by 0.8–1.6 microns wide. |
| 6 | 2 | ¹1 | 5 | 1 | E | 479 | 84.4 | 39.6 | 0.47 | Up to 3.5 microns long by up to 0.4 micron wide. |
| 7 | 2 | ¹1 | 5 | 2 | B | 283 | 84.9 | 36.8 | 0.43 | Mostly up to 2 microns long and up to 0.3 micron wide. |
| 8 | 2 | ¹2 | 5 | 0 | B | 336 | 88.5 | 41.3 | 0.47 | Up to 20 microns long, up to 0.5 micron wide. |
| 9 | 2 | ¹3 | 5 | 0 | B | 350 | 79.3 | 38.0 | 0.48 | |
| 10 | 4 | ¹2 | 5 | 1 | B | 237 | 88.0 | 35.6 | 0.41 | Mostly 3 microns or less by 0.3 micron or less. |

¹ Prepared by heating $Cr_2O_3 \cdot 9H_2O$ for 4 hours at 150° C. and then for 2 hours at 450° C.
B—Cold pressure to 850 atm., heat at 2° C./min. to 265° C., hold for 4 hours, heat at 2°C./min. to 400° C., and hold at 400° C./1,000 atm. for 6 hours.
D—Cold pressure to 2,600 atm., heat at 2° C./min. to 265°C., hold for 4 hours, heat at 2° C./min. to 400° C., and hold at 400° C./3,000 atm. E—Cold pressure to 875 atm., heat at 2° C./min. to 265° C., hold at 265° C. for 4 hours, heat at 1° C./min. to 350° C., and hold at 350°C./1,000 atm. for 6 hours.
F—Cold pressure to 2,600 atm., heat rapidly to 180° C., then heat at the rate of 10° C./15 min. to 450° C., hold at 450° C./3,000 atm. for 6 hours.

EXAMPLE 11

A. A mixture of 6 g. of $CrO_3$, 15 g. of $K_2Cr_2O_7$, and 1.2 g. of $H_2O$ was placed in a platinum tube which was then hermetically sealed. The tube was introduced into a larger pressure vessel and a pressure of 2800 atmospheres was applied. The temperature was raised to 220° C. in one hour and then further increased at a rate of 16° C./hour to 450° C. The pressure at 450° C. was 3000 atmospheres. A temperature of 450° C. and a pressure of 3000 atmospheres were maintained for 24 hours whereupon the vessel was cooled and the pressure released. The platinum tube was removed and opened. The product was a black solid which was washed thoroughly with water. The water-insoluble portion consisted of ferromagnetic chromium dioxide in the form of small particles 14–128 microns long and 0.8–3.2 microns in transverse dimensions. The magnetic properties were as follows:

Coercive force, oersteds _____ 27
Saturation induction (gauss cm.³/g.) _____ 91.8
Remanence (gauss cm.³/g.) _____ 14.7
Remanence ratio _____ 0.16

B. A fiber or filament was picked by hand from the product of A and tested for flexibility. The test was accomplished by cementing one end of the fiber to the tip of a fine tungsten rod which was then mounted horizontally above the stage of a compound microscope fitted with a camera attachment so that the fiber was in the field of the microscope. A fine chisel edge (a section of razor blade) was mounted on a micromanipulator and the edge moved into engagement with the free end of the crystal causing the crystal to be bent. The length of the fibrous crystal between the point of support and the chisel edge was about 120 microns. The crystal was 2–3 microns wide, and the third dimension was also 2–3 microns. The crystal was readily bent through an angle of about 30° and, on release, returned to its original straight position.

EXAMPLES 12–16

These examples illustrate use of various alkali metal dichromates in the process of this invention. The starting materials employed, the reaction conditions used, and the magnetic characteristics of the products are summarized in Table II.

EXAMPLES 17–24

These examples illustrate various modifications applicable to the process of this invention. The starting materials employed, the reaction conditions used, and the magnetic characteristics of the products are summarized in Table III.

EXAMPLE 25

A mixture of 4.5 g. of $CrO_3$ and 11.25 g. of sodium dichromate dihydrate were cold-pressed to 850 atmospheres and heated as rapidly as possible to 400° C. The pressure at 400° C. was 1000 atmospheres, and conditions of 400° C. and 1000 atmospheres were maintained for 12 hours, after which the mixture was cooled to room temperature and the pressure released. The product was chromium dioxide having the following magnetic properties:

$H_{ci}$, oersteds _____ 39
$\sigma_s$ (gauss cm.³/g.) _____ 92.8
$\sigma_r$ (gauss cm.³/g.) _____ 16.0
$\sigma_r/\sigma_s$ _____ 0.17

TABLE II

| Example No. | Charge (g.) | | | | | Magnetic properties | | | | Particle size and shape |
|---|---|---|---|---|---|---|---|---|---|---|
| | $CrO_3$ | $Cr_2O_3$ | Dichromate | Water | Cycle | $H_{ci}$ (oe.) | $\sigma_s$ (gauss cm³/g.) | $\sigma_r$ (gauss cm³/g.) | $\sigma_r/\sigma_s$ | |
| 12 | 2 | ¹1 | ²5 | 0.6 | B | 341 | 88.5 | 40.7 | 0.46 | Up to 6 microns long by up to 0.25 micron wide. |
| 13 | 2 | ¹1 | ³5 | 0 | B | 285 | 87.8 | 38.0 | 0.43 | Up to 12 microns long by up to 0.5 micron wide. |
| 14 | 2 | ¹1 | ³5 | 0.5 | B | 285 | 87.0 | 39.6 | 0.46 | Do. |
| 15 | 2 | ¹2 | ³5 | 0 | B | 366 | 86.5 | 40.5 | 0.47 | Up to 10 microns long by up to 0.5 micron wide. |
| 16 | 4.5 | 0 | ³11.25 | 0 | L | 42 | 89.3 | 25.4 | 0.28 | Up to 51 microns long and up to 3.2 microns wide. |

¹ Prepared by heating $Cr_2O_3 \cdot 9H_2O$ for 4 hours at 150° C. and then for 2 hours at 450° C.
² $K_2Cr_2O_7$.
³ $Li_2Cr_2O_7 \cdot 2H_2O$.
B—Cold pressure to 850 atm., heat at 2° C./min. to 265° C., hold for 4 hours, heat at 2°C./min. to 400° C., and hold at 400° C./1,000 atm. for 6 hours.
H—Cold pressure to 2,800 atm., heat in one hour to 220° C., heat at 4°C./15 min. to 450° C., and hold at 450° C./3,000 atm. for 24 hours. L—Cold pressure to 850 atm., heat to 400 °C. in 70 minutes, and hold at 400° C./1,000 atm. for 16 hours.

TABLE III

| Example No. | Charge (g.) | | | | | Cycle | Magnetic properties | | | $\sigma_s/\sigma_r$ | Particle size and shape |
|---|---|---|---|---|---|---|---|---|---|---|---|
| | $CrO_3$ | $Cr_2O_3$ | $Na_2Cr_2O_7 \cdot 2H_2O$ | Water | Other | | $H_{ci}$ (oe.) | $\sigma_s$ (gauss cm.$^3$.g.) | $\sigma_r$ (gauss cm.$^3$.g.) | | |
| 17 | 2 | [1] 1 | 5 | 0 | 0 | B | 206 | 89.5 | 37.0 | 0.41 | 30 microns or less by 1 micron or less. |
| 18 | 2 | [2] 2 | 5 | 0 | 0 | B | 68 | 88.6 | 25.1 | 0.28 | Up to 15 microns long by up to 2 microns wide. |
| 19 | 2 | [3] 3 | 5 | 0 | 0 | B | 394 | 85.5 | 39.8 | 0.47 | Up to 5 microns long by up to 0.15 micron wide. |
| 20 | 2 | [4] 1 | 5 | 0 | $Sb_2O_3$ (0.02) | B | 440 | 84.0 | 39.0 | 0.47 | Up to 10 microns long by up to 0.4 micron wide. |
| 21 | 2 | [4] 1 | 5 | 1 | $Fe_2O_3 \cdot 2.5H_2O$ (0.055). | B | 444 | 82.3 | 39.9 | 0.49 | Up to 3 microns long by up to 0.2 micron wide. |
| 22 | 2 | [4] 1 | 5 | 1 | do | E | 542 | 82.0 | 40.0 | 0.49 | 3.5 microns or less by 0.2 micron or less. |
| 23 | 0 | [4] 1 | [5] 10 | 0 | 1.9 cc. aqueous $HNO_3$ (70%). | B | 142 | 89.9 | 30.1 | 0.34 | Up to 12 microns long by up to 1 micron wide. |
| 24 | 3 | 0 | 7.5 | 0 | $CrO_2$ (0.58) | F | 37 | 92.8 | 18.5 | 0.20 | 8-168 microns long by by 0.8-8 microns wide |

[1] Prepared by heating $Cr_2O_3 \cdot 9H_2O$ at 470°C. for 3 hours.
[2] Uncalcined $Cr_2O_3 \cdot 9H_2O$.
[3] $Cr_2O_3 \cdot 9H_2O$ calcined at 525° C. for 2 hours.
[4] Prepared by heating $Cr_2O_3 \cdot 9H_2O$ for 4 hours at 150° C. and then for 2 hours at 450° C.
[5] The $Na_2Cr_2O_7$ was anhydrous.

B—Cold pressure to 850 atm., heat at 2° C./min. to 265° C., hold for 4 hours, heat at 2° C./min. to 400° C. and hold at 400° C./1000 atm. for 6 hours. E—Cold pressure to 895 atm., heat at 2° C./min. to 265° C., hold at 265° C. for 4 hours, heat at 1° C./min. to 350° C., and hold at 350° C./min atm. for 6 hours.
F—Cold pressure to 2,640 atm., heat rapidly to 180° C., then heat at the rate of 10° C./15 min. to 450° C., hold at 350° C./3,000 atm, for 6 hours.

The chromium dioxide produced by the process of this invention is useful as the magnetic component of magnetic recording members, such as the magnetic records used in television recording and in information storage. In preparing such records the chromium dioxide is dispersed in an organic polymeric binder and may be magnetically oriented while the binder remains sufficiently fluid to allow motion of the magnetic particles. The products of this invention can also be employed in magnetic inks and as developers in ferromagnetography, and can be compressed to form permanent magnets. The novel fibrous chromium dioxide can also be employed as reinforcing fibers in composite structures and in the production of interesting decorative effects in plastics by magnetically orienting the fibers during formation of the plastic article. In felted form, the fibers produce useful filters which are especially retentive for magnetic dusts.

Since obvious modifications and equivalents will be evident to those skilled in the chemical arts, I propose to be bound solely by the appended claims.

The embodiments of the invention in which an exclusive property or privilege is claimed are defined as follows.

I claim:
1. The process of preparing ferromagnetic chromium dioxide which comprises heating, at a temperature in the range 350–500° C. and under a pressure of at least 250 atmospheres,
   at least one chromium oxide in which the average valence of chromium is at least 4,
   in the presence of (1) 0.25–10 parts by weight of an alkali metal dichromate based on the weight of the chromium oxide and (2) water to the extent of at least 2 but not more than 5 moles of water per mole of dichromate.
2. The process of claim 1 in which there is also present in the reaction mixture a modifier for chromium dioxide selected from the group consisting of iron, antimony, ruthenium, tellurium, and compounds thereof.
3. The process of claim 1 in which the alkali metal dichromate is selected from the group consisting of lithium, sodium, potassium, rubidium and cesium dichromates and inter se mixtures thereof.
4. The process of claim 1 in which the chromium oxide is selected from the group consisting of $CrO_3$, $Cr_2O_5$, $Cr_3O_8$ and inter se mixtures thereof.
5. The process of claim 1 in which chromium (III) oxide, $Cr_2O_3$, is also employed as a reactant along with $CrO_3$.
6. The process of claim 4 employing $Cr_2O_3$, $CrO_3$, and $Na_2Cr_2O_7 \cdot 2H_2O$.
7. The process of claim 1 employing $CrO_3$ prepared in situ by reaction of alkali metal dichromate with acid.
8. The process of claim 1 in which the only chromium oxide present is $CrO_3$.
9. Acicular particulate ferromagnetic chromium dioxide having an intrinsic coercive force up to about 50 oersteds, a saturation magnetization of 85–95 e.m.u./grams, and a remanence ratio of about 0.15–0.30, said ferromagnetic chromium oxide being in the form of long, thin, fibrous, flexible, ribbons or filaments ranging from about 20 microns up to about 200 microns in length and from about 0.8 micron up to about 8 microns in width, the ratio of length to width being at least 10:1 and usually 50:1 to 200:1.

References Cited

UNITED STATES PATENTS 3,278,263  10/1966  Cox _____ 252—62.51

TOBIAS E. LEVOW, *Primary Examiner.*

J. COOPER, *Assistant Examiner.*

U.S. Cl. X.R.

252—62.51